2,771,265

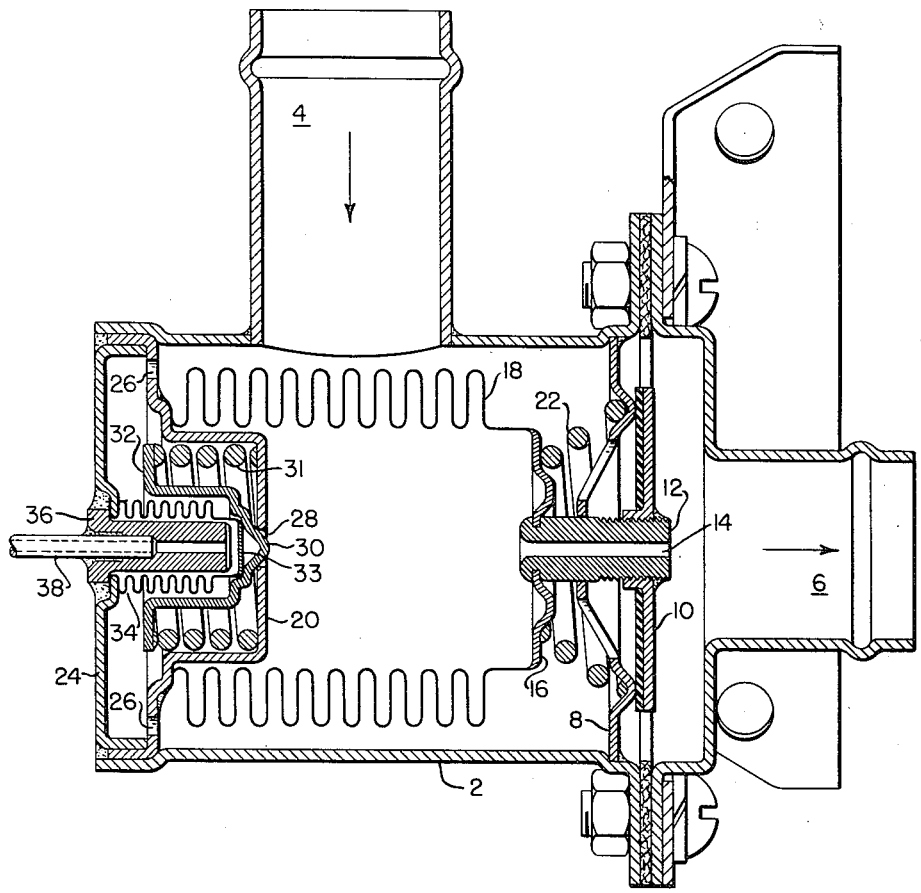

PILOT OPERATED VALVE

John E. Woods, Cohasset, Mass., assignor to Standard-Thomson Corporation, Boston, Mass., a corporation of Delaware Application February 12, 1952, Serial No. 271,216

2 Claims. (Cl. 251—28)

The present invention relates to valve assemblies, particularly pilot valves, and has for its object to construct a simple, inexpensive, and reliably operated pilot valve. To this end the invention comprises the valve hereinafter described and particularly defined in the claims.

The accompanying drawing is a sectional elevation of the preferred form of pilot valve according to the present invention.

The invention is herein illustrated and described as embodied in an automobile heating system wherein expansion of a thermostatic liquid operates a pilot valve which in turn controls the operation of the water valve for the heater.

The water valve comprises a casing 2 having an inlet 4 and an outlet 6. In an automobile heating system the inlet 4 will be subjected to the pressure of the automotive water pump and the outlet 6 will be connected to the suction side of the pump. The casing 2 supports a plate 8 having a valve seat against which a reciprocating valve member 10 is adapted to engage. The valve member 10 is mounted on a rod 12 which is proivded with an internal water passage 14 for a purpose to be described later.

The rod 12 is mounted on the end plate 16 of an expansible chamber (bellows) 18 which is secured at its left end to a cup member 20 forming a part of the pilot valve as will presently be described. A compression spring 22 between the plate 8 and the bellows head 16 urges the valve member 10 to closed position.

The cup 20 is secured on a tubular support 24 having openings 26 by which water may enter from the inlet 4 into the interior of the cup.

The cup member has a pilot valve opening 28 at the right end and the opening is adapted to be closed by a pilot valve member 30 which is itself formed as a cup. A spring 31 bears between the interior of the cup 20 and a flange 32 on the rear of the cup 30. The right end of the cup 30 is secured to a movable head 33 secured to the end of a control bellows 34 which in turn is secured to a capillary fitting 36. The fitting 36 is connected with an external capillary 38 by which liquid under pressure may be introduced into the interior of the control bellows 34. In use as a thermostat the capillary 38 is connected to a suitable bulb containing thermostatic liquid and disposed in the space in which the temperature is to be controlled, as, for example, in the automobile body whereby, upon an increase in temperature the control bellows 34 is expanded and the head 32 is moved toward the right so that the pilot valve cup 30 closes the aperture 28. In this assembly the bulb, the capillary, and the bellows 34 are all completely filled with liquid.

When the pilot valve 30 is closed the main valve 10 is closed. This follows from the fact that the area of the valve seat and the effective area of the bellows 18 are substantially equal whereby a balanced condition exists. Preferably the forces are slightly overbalanced toward closed position, and this overbalance, together with the spring 22, maintains the valve 10 closed when the pilot valve is closed. Upon contraction of the thermostatic liquid in the capillary 38, however, as determined by a demand for heat, the valve 30 is opened, thereby permitting water pressure to be applied through the openings 26 and the opening 28 to the interior of the bellows 18. Then there is a resultant opening force on the main valve 10, thereby causing the valve to open and permitting water to flow from the inlet 4 through the main valve to the outlet 6. This condition exists as long as the pilot valve 30 is open.

When the temperature in the space to be heated rises to its desired value, the liquid in the capillary 38 expands sufficiently to cause the valve cup 30 to close the pilot aperture 28. The pressure of the liquid within the bellows 18 is then relieved by the flow of water through the small passage 14 which has been previously described. This again allows the original balance of forces to be restored, thereby causing the valve 10 to close. It will be observed that the passage 14 is small and is in fact small enough so that only a relatively small amount of water will pass therethrough when the valve 10 is open, but will allow a sufficient passage of water to relieve the pressure within the bellows 18 when the valve 10 is to be closed.

Having thus described my invention, I claim:

1. A valve assembly having, in combination, a casing, a main valve seat defining an inlet space and an outlet space in the casing, a support member dividing the inlet space into sections, said member having peripheral openings and forming a central pilot valve seat, a main valve, an expansible chamber in one of said inlet sections having a head secured to the main valve and the end opposite its head sealed to said support member intermediate said openings and the pilot valve seat, said chamber communicating exteriorly directly with said inlet space, a pilot valve situated adjacent said support member seat on the side thereof opposite to said chamber, a control bellows supported by the casing and operatively associated with the pilot valve, and means to connect the bellows to a pressure source externally of the casing, said pilot valve having provision to become open upon a contraction of the bellows to admit liquid through said pilot valve to the interior of the chamber, said chamber having a leakage opening to said outlet space through the main valve.

2. A valve assembly having, in combination, a casing, a main valve seat defining an inlet space and an outlet space in the casing, a support member dividing the inlet space into sections, said member having peripheral openings and forming a central pilot valve seat, a main valve, an expansible chamber in one of said inlet sections having a head secured to the main valve and the end opposite its head sealed to said support member intermediate said openings and the pilot valve seat, said chamber communicating exteriorly directly with said inlet space and having an effective area substantially equal to that of the main valve seat, a pilot valve situated adjacent said support member seat on the side thereof opposite to said chamber, a control bellows supported by the casing and operatively associated with the pilot valve, and means to connect the bellows to a pressure source externally of the casing, said pilot valve having provision to become open upon a contraction of the bellows to admit liquid through said pilot valve to the interior of the chamber, said chamber having a leakage opening to said outlet space through the main valve.

References Cited in the file of this patent

UNITED STATES PATENTS

| | | |
|---|---|---|
| 1,612,567 | Browne | Dec. 28, 1926 |
| 1,925,301 | Campbell | Sept. 5, 1933 |
| 2,200,318 | Yonkers | May 14, 1940 |
| 2,564,133 | Stadler | Aug. 14, 1951 |
| 2,575,042 | Branson | Nov. 13, 1951 |